(12) United States Patent
Zou et al.

(10) Patent No.: US 11,347,044 B2
(45) Date of Patent: May 31, 2022

(54) LOW RESOLUTION SLIDE IMAGING AND SLIDE LABEL IMAGING AND HIGH RESOLUTION SLIDE IMAGING USING DUAL OPTICAL PATHS AND A SINGLE IMAGING SENSOR

(71) Applicant: LEICA BIOSYSTEMS IMAGING, INC., Vista, CA (US)

(72) Inventors: Yunlu Zou, San Diego, CA (US); Nicholas Newberg, San Marcos, CA (US); Gregory Crandall, San Marcos, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

(21) Appl. No.: 17/072,785

(22) Filed: Oct. 16, 2020

(65) Prior Publication Data

US 2021/0048659 A1 Feb. 18, 2021

Related U.S. Application Data

(63) Continuation of application No. 16/557,623, filed on Aug. 30, 2019, now Pat. No. 10,809,514, which is a (Continued)

(51) Int. Cl.
*G02B 21/36* (2006.01)
*G02B 21/00* (2006.01)
(Continued)

(52) U.S. Cl.
CPC ......... *G02B 21/361* (2013.01); *G02B 21/002* (2013.01); *G02B 21/26* (2013.01);
(Continued)

(58) Field of Classification Search
None
See application file for complete search history.

(56) References Cited

U.S. PATENT DOCUMENTS 7,801,352 B2 * 9/2010 Uchiyama ............ G02B 21/367
　　　　　　　　　　　　　　　　　　　　　382/133
9,609,194 B2 * 3/2017 Egger ....................... G01J 3/10
(Continued)

FOREIGN PATENT DOCUMENTS

CN　　　110140129 A　　8/2019
JP　　　2003-084203 A　　3/2003
(Continued)

OTHER PUBLICATIONS

Office Action in European Application No. 17888230.4 dated Feb. 18, 2022, in 9 pages.
(Continued)

*Primary Examiner* — Lindsay J Uhl
(74) *Attorney, Agent, or Firm* — Knobbe, Martens, Olson & Bear, LLP (57) ABSTRACT

A digital pathology imaging apparatus includes a single line scan camera sensor optically coupled with first and second optical paths. In a first embodiment, transmission mode illumination and oblique mode illumination are simultaneously used during a single stage movement that captures a low resolution macro image of the entire sample area and the entire label area of the slide via the first optical path. In a second embodiment, transmission mode illumination is used during a first stage movement that captures a low resolution macro image of at least the entire sample area via the first optical path and oblique mode illumination is used during a second stage movement that captures a low resolution macro image of at least the entire label area via the first optical path.

20 Claims, 8 Drawing Sheets

Related U.S. Application Data continuation of application No. 15/858,487, filed on Dec. 29, 2017, now Pat. No. 10,409,049.

(60) Provisional application No. 62/440,604, filed on Dec. 30, 2016.

(51) Int. Cl.
*G02B 21/26* (2006.01)
*G02B 21/34* (2006.01)
*G02B 21/24* (2006.01)

(52) U.S. Cl.
CPC ......... *G02B 21/34* (2013.01); *G02B 21/365* (2013.01); *G02B 21/245* (2013.01); *G06T 2207/10056* (2013.01)

(56) References Cited

U.S. PATENT DOCUMENTS

| | | | |
|---|---|---|---|
| 10,409,049 B2 | 9/2019 | Zou et al. | |
| 10,809,514 B2 | 10/2020 | Zou et al. | |
| 2004/0167806 A1 | 8/2004 | Eichhorn et al. | |
| 2006/0238846 A1 | 10/2006 | Alexander et al. | |
| 2007/0103581 A1 | 5/2007 | Dwinell et al. | |
| 2009/0160994 A1 | 6/2009 | Ganser | |
| 2011/0115897 A1 | 5/2011 | Najmadadi et al. | |
| 2012/0044342 A1* | 2/2012 | Hing | G02B 21/367 348/79 |
| 2012/0099852 A1 | 4/2012 | Staker et al. | |
| 2014/0226866 A1 | 8/2014 | Crandall et al. | |
| 2015/0054921 A1* | 2/2015 | Dixon | G02B 21/008 348/46 |
| 2015/0130920 A1 | 5/2015 | Zou et al. | |
| 2016/0299057 A1* | 10/2016 | Casas | G02B 21/367 |

FOREIGN PATENT DOCUMENTS

| | | |
|---|---|---|
| JP | 2004-514920 A | 5/2004 |
| JP | 2012-003004 A | 1/2012 |
| JP | 2020-507106 A | 3/2020 |
| WO | WO2014/205557 | 12/2014 |
| WO | WO2018/126138 A1 | 7/2018 |

OTHER PUBLICATIONS

Anonymous, "Application Note—Line Scan Imaging Basics", Internet Citation, Jan. 21, 2003, Retrieved from the Internet: URL:http://info.leledynedalsa.com/acton/attachment/14932/f-03ce/1/-/-/-/-/00541-00_03-32_Linescan_Imaging_Basics.pdf [retrieved on Nov. 2, 2017].

Extended European Search Report for EP 17888230.4 dated Jul. 13, 2020 in 9 pages.

International Search Report and Written Opinion issued in International Application No. PCT/US2017/068963 dated Mar. 8, 2018 in 9 pages.

Office Action in Japanese Application No. 2019-535904 dated May 10, 2021, in 11 pages.

* cited by examiner

SINGLE LINE WITH RGB MASK

| R | G | B | R | G | B | R | G | B | R | G | B | R | G | B | R | G | B | R | G | B |

FIG. 2A

DUAL LINE WITH RGB MASK

| R | B | R | B | R | B | R | B | R | B | R | B | R | B | R | B | R | B | R | B | R | B |
| G | G | G | G | G | G | G | G | G | G | G | G | G | G | G | G | G | G | G | G | G | G |

FIG. 2B

TRILINEAR LINE

| R | R | R | R | R | R | R | R | R | R | R | R | R | R | R | R | R | R | R | R | R |
| G | G | G | G | G | G | G | G | G | G | G | G | G | G | G | G | G | G | G | G | G |
| B | B | B | B | B | B | B | B | B | B | B | B | B | B | B | B | B | B | B | B | B |

FIG. 2C

THREE LINE CHIPS WITH PRISM

| R | R | R | R | R | R | R | R | R | R | R | R | R | R | R | R | R | R | R | R | R |
| G | G | G | G | G | G | G | G | G | G | G | G | G | G | G | G | G | G | G | G | G |
| B | B | B | B | B | B | B | B | B | B | B | B | B | B | B | B | B | B | B | B | B |

LOW RESOLUTION SLIDE IMAGING AND SLIDE LABEL IMAGING AND HIGH RESOLUTION SLIDE IMAGING USING DUAL OPTICAL PATHS AND A SINGLE IMAGING SENSOR

RELATED APPLICATION

The present application is a continuation of U.S. patent application Ser. No. 16/557,623, filed on Aug. 30, 2019, which is a continuation of U.S. patent application Ser. No. 15/858,487, filed on Dec. 29, 2017, which claims priority to U.S. Provisional Patent Application No. 62/440,604, filed on Dec. 30, 2016, which are all hereby incorporated herein by reference as if set forth in full.

BACKGROUND

Field of the Invention

The present invention generally relates to digital imaging systems and more specifically relates to digital pathology imaging systems using a line scan camera.

Related Art

Conventional glass slides typically have a specimen area that contains a biological specimen and a separate label area that contains a bar code (e.g., a one dimensional bar code, QR code, two dimensional bar code or the like) or contains a printed or handwritten label. In an automatic whole slide imaging (WSI) scanning device, a low resolution macro image of the entire specimen area of the glass slide is typically scanned at a first magnification using illumination from below the glass slide and the resulting low resolution digital image (referred to herein as a "macro image") is subsequently used for identifying the specimen areas on the slide and to provide a thumbnail image of the specimen on the slide. Separately (before or after), the entire label area of the glass slide is typically scanned at a second magnification using illumination from above the glass so that the digital slide image of the specimen may be identified for tracking and inventorying. The low resolution macro image and the label image are typically scanned using optical paths that include a low resolution lens optically coupled with an area scan imaging sensor.

After the macro image and label image are scanned, a high resolution WSI image is typically scanned at a third (much higher) magnification using illumination from below or above (in the case of epi-illumination) the glass slide and also using a separate optical path that includes a high resolution lens, high magnification optics, and a separate high fidelity imaging sensor. The resulting image tiles (in the case of area scanning) or image stripes (in the case of line scanning) from the high resolution scan are assembled together into a composite whole slide image. The need for plural tiles or stripes to capture the high resolution WSI is due to the limited field of view ("FOV") of the high fidelity imaging sensor at high magnification.

The need for additional imaging hardware, additional scanning motion, and additional image acquisition increases the cost of the scanning device and increases the overall time required to complete a whole slide imaging scan. Therefore, what is needed is a system and method that overcomes these significant problems found in the conventional systems as described above.

SUMMARY

In the present disclosure, systems and methods are provided for minimizing the hardware requirements and processing time for generating the macro image and the label image in a scanning device employing line scanning. The disclosed scanning system includes two optical paths. A first optical path includes a low resolution lens, a first illumination system (transmission mode illumination from below), and a second illumination system (oblique mode illumination from above). A second optical path includes a high resolution lens and at least a third illumination system (e.g., transmission mode). Each of the optical paths is optically coupled to the same line scan sensor.

Advantageously, the first optical path is used to scan a single whole slide image of the sample area and the label area during the same scanning motion and at the same magnification using one or both of the first and second illumination systems. The whole slide image can be processed to generate a separate macro image and a separate label image. The resulting macro image and label image are both functionally suitable for their intended uses, namely for identifying the specimen areas on the slide and to provide a thumbnail image of the specimen on the slide (macro image) and for tracking and inventorying of the digital slide image (label image). The second optical path is used for high resolution scanning at high magnification. Advantageously, no modifications need to be made to the second high fidelity, high magnification optical path.

In a first embodiment, a stage moves the sample across the FOV of the line sensor using the first optical path while the slide is being illuminated using both the first illumination system and the second illumination system. Advantageously, in accordance with the lens and any other optics in the first optical path, the FOV of the line sensor covers the entire width of the sample area of the slide. As the stage is moved across the FOV of the line sensor, a whole slide image including the entire sample area is captured in a single continuous stage movement. Similarly, the FOV of the line sensor covers the entire width of the label area of the slide and therefore the whole slide image that is captured in a single stage movement also includes the entire label area. Advantageously, the whole slide image can be processed to generate separate images of the entire label area and the entire specimen area.

During image capture of the whole slide image in a single stage movement (i.e., a single stripe), the line scan camera is configured with a single set of parameters and the intensities of the first and second illumination systems are optimized for best image quality for their associated images based on the line scan camera configuration parameters. Advantageously, during image capture of the sample area portion of the slide, the transmission mode illumination system dominates the optical path such that the resulting image of the sample area is not impacted by the presence of light from the oblique mode illumination system. Additionally, during image capture of the label area portion of the slide, light from the transmission mode illumination system is blocked by the label, which is not transparent, such that the resulting image of the label area is not impacted by the presence of light from the transmission mode illumination system. In the case of an etched label, the transmission mode illumination would dominate the imaging of the label area.

In a second embodiment, bi-directional scanning is used to scan the glass slide in a first stage movement in a first direction and to scan the glass slide in a second stage movement in a second direction. During scanning in the first direction, a first illumination system is used and the line scan camera is configured with a first set of parameters. During scanning in the second (opposite) direction, a second illumination system is used and the line scan camera is configured with a second set of parameters. For example, the line scan camera is first configured with a first set of parameters and the stage moves the slide in a first direction with respect to the FOV of the line scan camera and the slide is illuminated using the first illumination system. A first whole slide image is captured during movement in the first direction and illumination by the first illumination system. The line scan camera is subsequently re-configured with a second set of parameters and the stage moves the slide in a second direction (e.g., opposite the first direction) with respect to the FOV of the line scan camera and the slide is illuminated using the second illumination system. A second whole slide image is captured during movement in the second direction and illumination by the second illumination system. The first whole slide image is combined with the second whole slide image to generate a final whole slide image that includes both the sample area and the label area. Advantageously, the first and second whole slide images can be processed to generate a separate image of the entire label area and a separate image of the entire specimen area.

There are two major advantages associated with single stage movement or dual stage movement low resolution image scanning with line scan camera that distinguish this new method over the traditional step-and-snap method using an area camera: speed and image resolution. For example, a 4 k line scan camera running at a 7,500 Hz line rate provides a thirty-two megapixel resolution whole slide image in one to two seconds as compared to the five megapixel resolution whole slide image that requires for to five seconds using an area camera.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for generation of a whole slide image of a slide that includes both the sample area of the slide and the label area of the slide. The resulting whole slide image can be processed to generate separate images of the sample area of the slide and the label area of the slide. For example, one method disclosed herein allows for scanning a whole slide image in a single stage movement, where the resulting whole slide image includes the entire sample area and the entire label area. When the whole slide image is scanned in the single stage movement, the glass slide is simultaneously subject to illumination from a transmission mode illumination system and an oblique mode illumination system. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
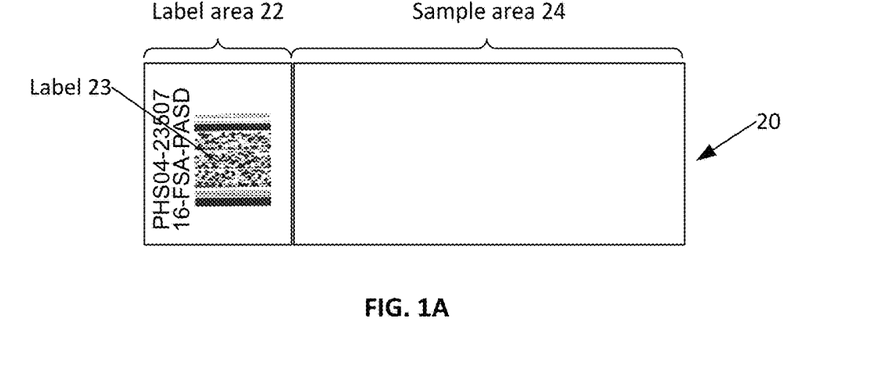
FIG. 1A is a block diagram illustrating an example glass slide according to an embodiment of the invention.

FIG. 1A is a block diagram illustrating an example glass slide 20 according to an embodiment of the invention. In the illustrated embodiment, the glass slide includes a label area 22 having bar code label 23 and a specimen area 24. The specimen area is configured to support a microscope sample (also referred to herein as a specimen). The glass slide 20 is a adaptable for use with a digital pathology system that may include a digital pathology imaging apparatus that is configured to scan the glass slide 20 to generate a digital image of the glass slide 20, including both the label area 22 and the sample area 24.

Figure 1B:
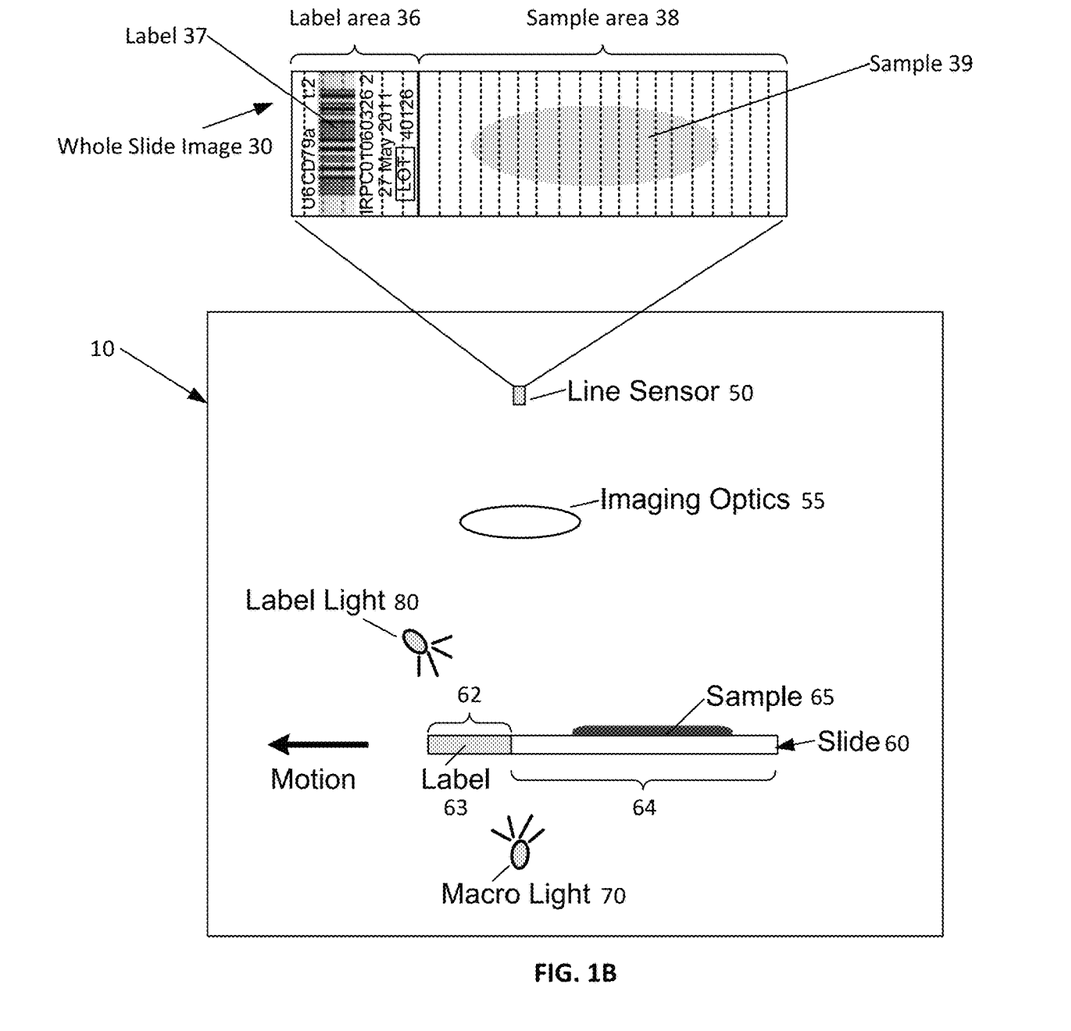
FIG. 1B is a block diagram illustrating an example system for combined macro imaging and label imaging of a slide according to an embodiment of the invention.

FIG. 1B is a block diagram illustrating an example system 10 for combined macro imaging and label imaging of a slide according to an embodiment of the invention. In the illustrated embodiment, the system 10 includes a line scan camera 50 optically coupled with imaging optics 55 to define an optical path such that the line scan camera 50 has a field of view of a portion of the glass slide 60. The slide 60 includes a sample area 64 within which a sample 65 is positioned and a label area 62 within which a label 63 is positioned. The system 10 includes two illumination systems: (1) a first illumination system 70 configured for transmission mode illumination; and (2) a second illumination system 80 configured for oblique mode illumination. The first illumination system 70 transmits light through the glass slide 60 and the specimen into the imaging optics 55 and onto the line scan camera 50. In one embodiment, the first transmission illumination system 70 is used for capturing a macro image of the sample area 64. The second illumination system 80 transmits light at an angle onto a top surface of the glass slide 60 that is facing the imaging optics 55. In one embodiment, the second oblique illumination system 80 is used for capturing a macro image of the label area 62.

The system 10 is configured to move the slide 60 with respect to the field of view of the line scan camera 50 and capture a whole slide image 30 of the slide 60 in a single stage movement. The resulting whole slide image 30 includes a label area 36 depicting the entire label area 62 of the slide 60 and the resulting whole slide image 30 includes a sample area 38 depicting the entire sample area 64 of the slide 60.

Figure 2A:
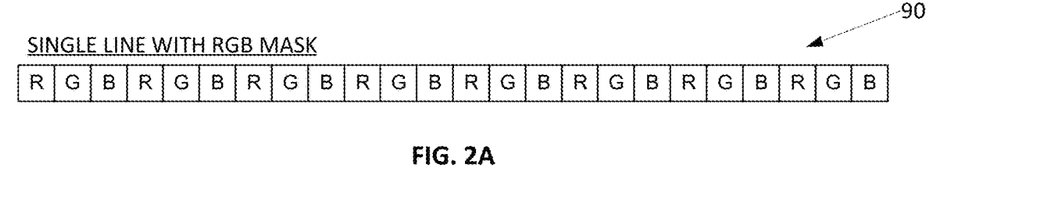
FIG. 2A is a block diagram illustrating an example single line color line scan sensor according to an embodiment of the invention.

FIG. 2A is a block diagram illustrating an example single line color line scan sensor 90 according to an embodiment of the invention. The illustrated line scan sensor 90 can be used for both uni-directional scanning and bi-directional scanning. Advantageously, when the line scan sensor 90 is used for bi-directional scanning, the line scan sensor 90 does not need to be reconfigured between movement of the stage supporting the sample in a first direction and movement of the stage supporting the sample in a second (opposite the first) direction.

Figure 2B:
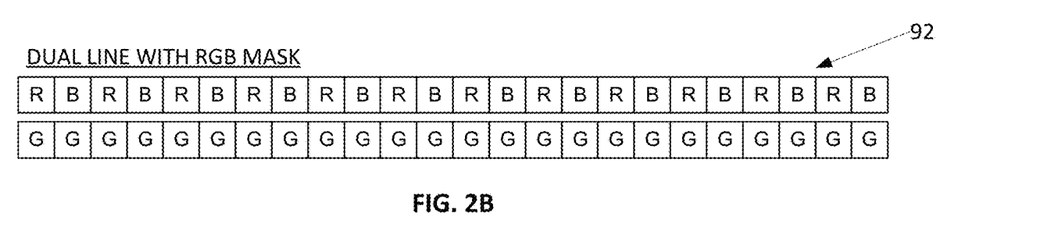
FIG. 2B is a block diagram illustrating an example dual line color line scan sensor according to an embodiment of the invention.

FIG. 2B is a block diagram illustrating an example dual line color line scan sensor 92 according to an embodiment of the invention. The illustrated line scan sensor 92 can be used for both uni-directional scanning and bi-directional scanning. In one embodiment, when the line scan sensor 92 is used for bi-directional scanning, the line scan sensor 92 is reconfigured between movement of the stage supporting the sample in a first direction and movement of the stage supporting the sample in a second (opposite the first) direction.

Figure 2C:
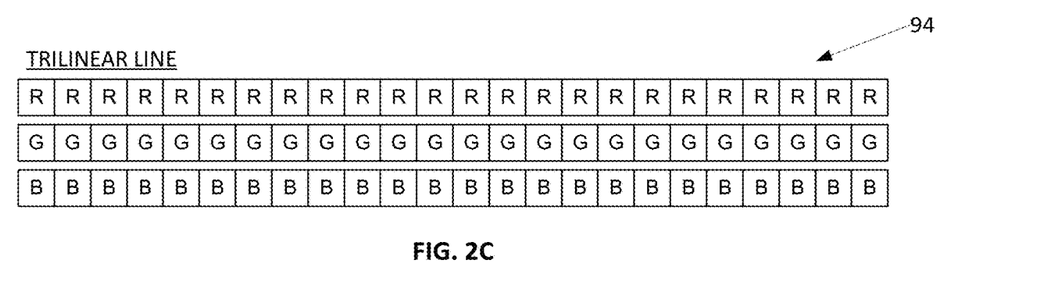
FIG. 2C is a block diagram illustrating an example trilinear color line scan sensor according to an embodiment of the invention.

FIG. 2C is a block diagram illustrating an example trilinear color line scan sensor 94 according to an embodiment of the invention. The illustrated line scan sensor 94 can be used for both uni-directional scanning and bi-directional scanning. In one embodiment, when the line scan sensor 94 is used for bi-directional scanning, the line scan sensor 94 is reconfigured between movement of the stage supporting the sample in a first direction and movement of the stage supporting the sample in a second (opposite the first) direction.

Figure 2D:
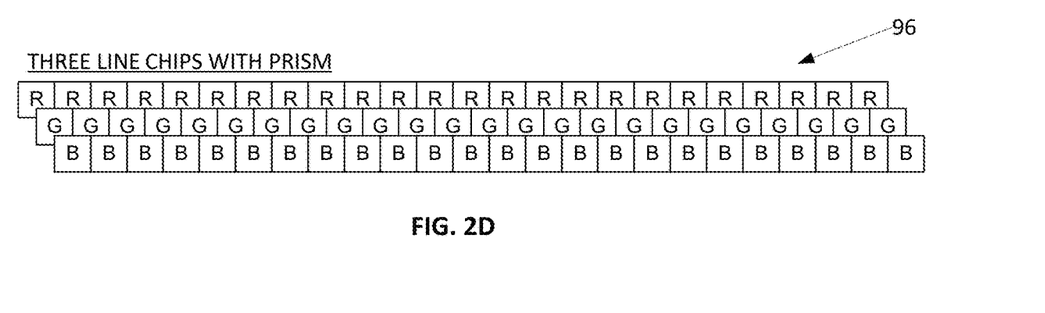
FIG. 2D is a block diagram illustrating an example color line scan sensor according to an embodiment of the invention.

FIG. 2D is a block diagram illustrating an example color line scan sensor 96 according to an embodiment of the invention. The illustrated line scan sensor 96 can be used for both uni-directional scanning and bi-directional scanning. Advantageously, when the line scan sensor 96 is used for bi-directional scanning, the line scan sensor 90 does not need to be reconfigured between movement of the stage supporting the sample in a first direction and movement of the stage supporting the sample in a second (opposite the first) direction.

Figure 3:
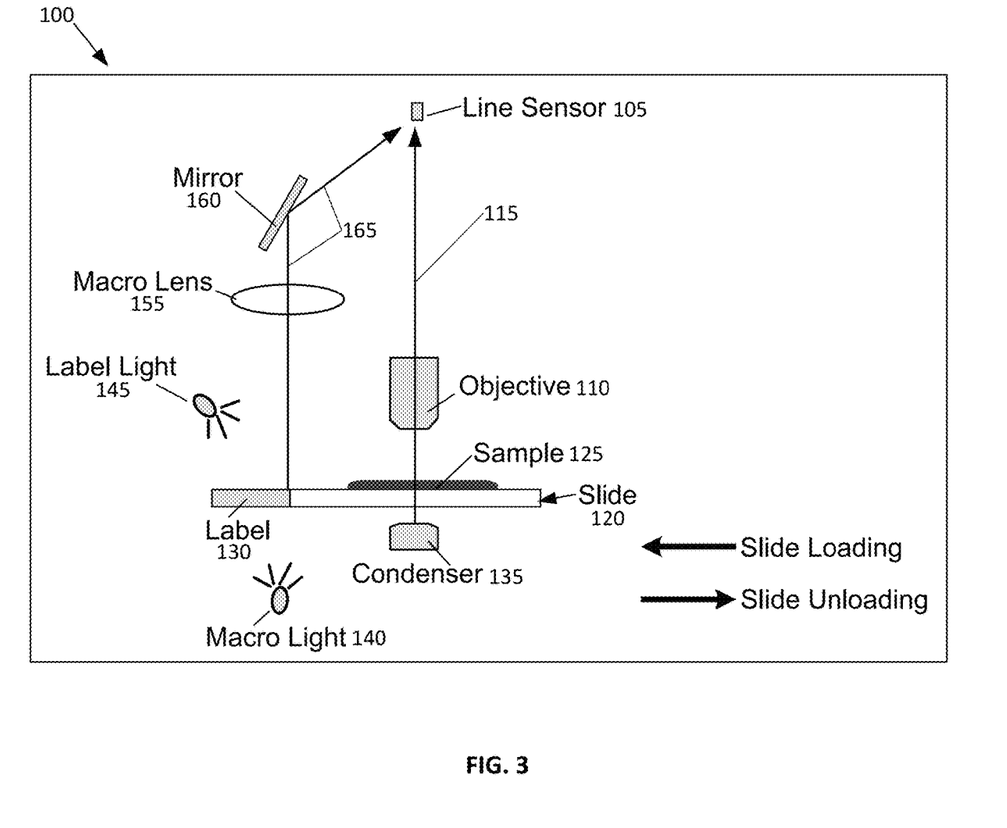
FIG. 3 is a block diagram illustrating an example system for combined macro imaging and label imaging of a slide according to an embodiment of the invention.

FIG. 3 is a block diagram illustrating an example system 100 for combined macro imaging and label imaging of a slide according to an embodiment of the invention. It should be noted that macro imaging and label imaging may both be referred to herein as low resolution imaging. In the illustrated embodiment, the system 100 comprises a line scan camera 105 that is optically coupled with a macro lens 155 and mirror 160 to define a first optical path 165 such that the line scan camera 105 has a field of view than can be trained on any portion of the slide 120 by movement of the scanning stage (not shown). The stage supports the glass slide 120, which in turn supports a sample 125. The glass slide 120 also has a label 130.

The first optical path may be illuminated by a first illumination system comprising macro light 140 that is configured for transmission mode illumination. The first optical path 165 may be also illuminated by a second illumination system comprising label light 145 that is configured for oblique mode illumination. Advantageously, in one embodiment, the first optical path 165 may be simultaneously illuminated by both the first illumination system by way of the macro light 140 and the second illumination system by way of the label light 145.

The line scan camera 105 of the scan camera is also optically coupled with objective lens 110 to define a second optical path 115 such that the line scan camera 105 has a field of view of the slide 120. The second optical path 115 is illuminated by a third illumination system comprising condenser 135 that is configured for transmission mode illumination. The second optical path 115 is used for high resolution imaging and high magnification imaging via the objective lens 110.

In operation, when a glass slide 120 is loaded onto the scanning stage, the scanning stage moves the glass slide 120 into a scanning position in the second optical path 115 with respect to the objective lens 110. In one embodiment, when positioning the glass slide in the second optical path 115 with respect to the objective lens 110, the system 100 first causes the scanning stage to move the glass slide 120 under the field of view of the line scan camera 104 according to the first optical path 165. This first movement of the glass slide in a first direction with respect to the line scan camera 105 and the first optical path 165 may result in a whole slide image of the entire glass slide 120. Alternatively, the first movement of the glass slide in the first direction with respect to the line scan camera 105 and the first optical path 165 may result in a whole slide image of only a first portion of the glass slide 120.

In this embodiment, the orientation of the first optical path 115 and the second optical path 165 requires that the glass slide 120 be subject to a second movement of the glass slide 120 in a second direction with respect to the line scan camera 105 and the first optical path 165 in order to position the glass slide in the second optical path 115 with respect to the objective lens 110. Accordingly, this second movement of the glass slide 120 in the second direction with respect to the line scan camera 105 and the first optical path 165 may result in a second whole slide image of the entire glass slide 120 or it may result in a whole slide image of only a second portion of the glass slide 120.

Figure 4:
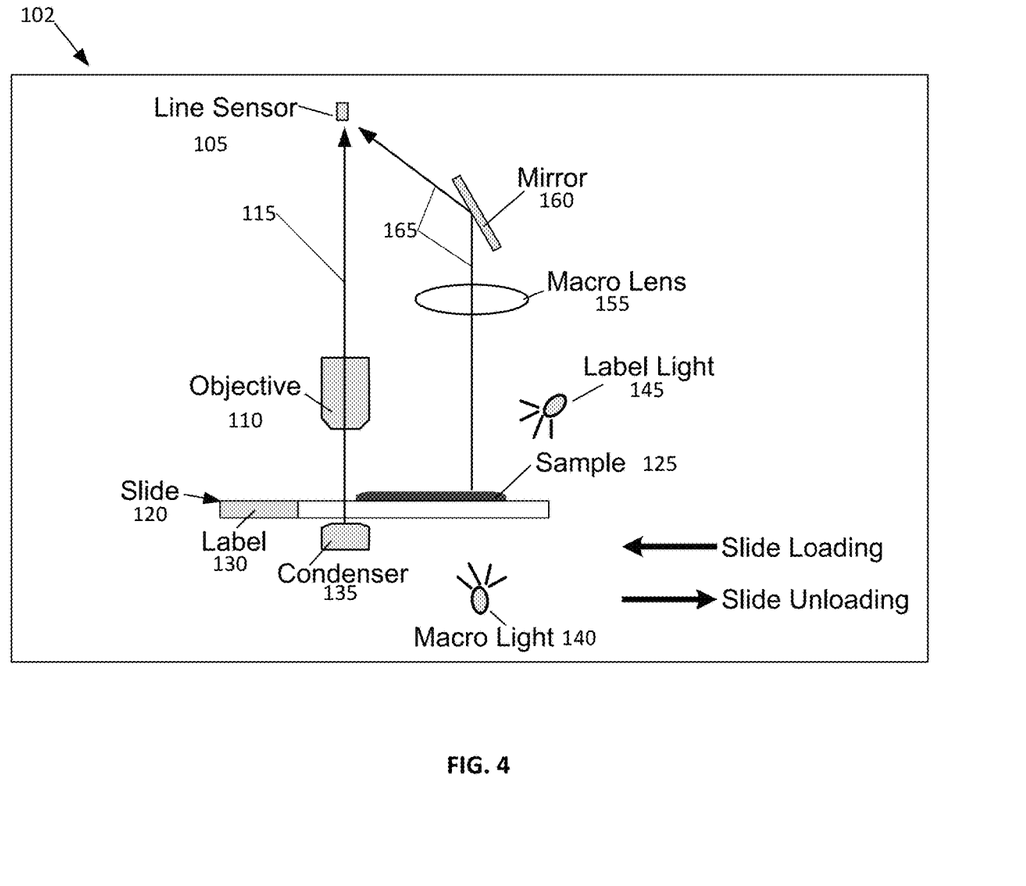
FIG. 4 is a block diagram illustrating an alternative example system for combined macro imaging and label imaging of a slide according to an embodiment of the invention.

FIG. 4 is a block diagram illustrating an alternative example system 102 for combined macro imaging and label imaging of a slide according to an embodiment of the invention. In the illustrated embodiment, the system 102 comprises a line scan camera 105 that is optically coupled with a macro lens 155 and mirror 160 to define a first optical path 165 such that the line scan camera 105 has a field of view than can be trained on any portion of the slide 120 by movement of the scanning stage (not shown). The stage supports the glass slide 120, which in turn supports a sample 125. The glass slide 120 also has a label 130.

The first optical path may be illuminated by a first illumination system comprising macro light 140 that is configured for transmission mode illumination. The first optical path 165 may be also illuminated by a second illumination system comprising label light 145 that is configured for oblique mode illumination. Advantageously, in one embodiment, the first optical path 165 may be simultaneously illuminated by both the first illumination system by way of the macro light 140 and the second illumination system by way of the label light 145.

The line scan camera 105 of the scan camera is also optically coupled with objective lens 110 to define a second optical path 115 such that the line scan camera 105 has a field of view of the slide 120. The second optical path 115 is illuminated by a third illumination system comprising condenser 135 that is configured for transmission mode illumination. The second optical path 115 is used for high resolution imaging and high magnification imaging via the objective lens 110.

In operation, when a glass slide 120 is loaded onto the scanning stage, the scanning stage moves the glass slide 120 into a scanning position in the second optical path 115 with respect to the objective lens 110. In one embodiment, when positioning the glass slide in the second optical path 115 with respect to the objective lens 110, the system 100 first causes the scanning stage to move the glass slide 120 under the field of view of the line scan camera 104 according to the first optical path 165. This first movement of the glass slide in a first direction with respect to the line scan camera 105 and the first optical path 165 may result in a whole slide image of the entire glass slide 120. Alternatively, the first movement of the glass slide in the first direction with respect to the line scan camera 105 and the first optical path 165 may result in a whole slide image of only a first portion of the glass slide 120.

In this embodiment, the orientation of the first optical path 115 and the second optical path 165 requires that the glass slide 120 next be delivered to the scanning position in the second optical path 115 with respect to the objective lens 110 for further processing (e.g., high resolution, high magnification scanning). Subsequent to the further processing, the glass slide 120 is subjected to a second movement of the glass slide 120 in a second direction with respect to the line scan camera 105 and the first optical path 165 prior to unloading the glass slide 120 from the scanning stage. Accordingly, this second movement of the glass slide 120 in the second direction with respect to the line scan camera 105 and the first optical path 165 may result in a second whole slide image of the entire glass slide 120 or it may result in a whole slide image of only a second portion of the glass slide 120.

Figure 5A:
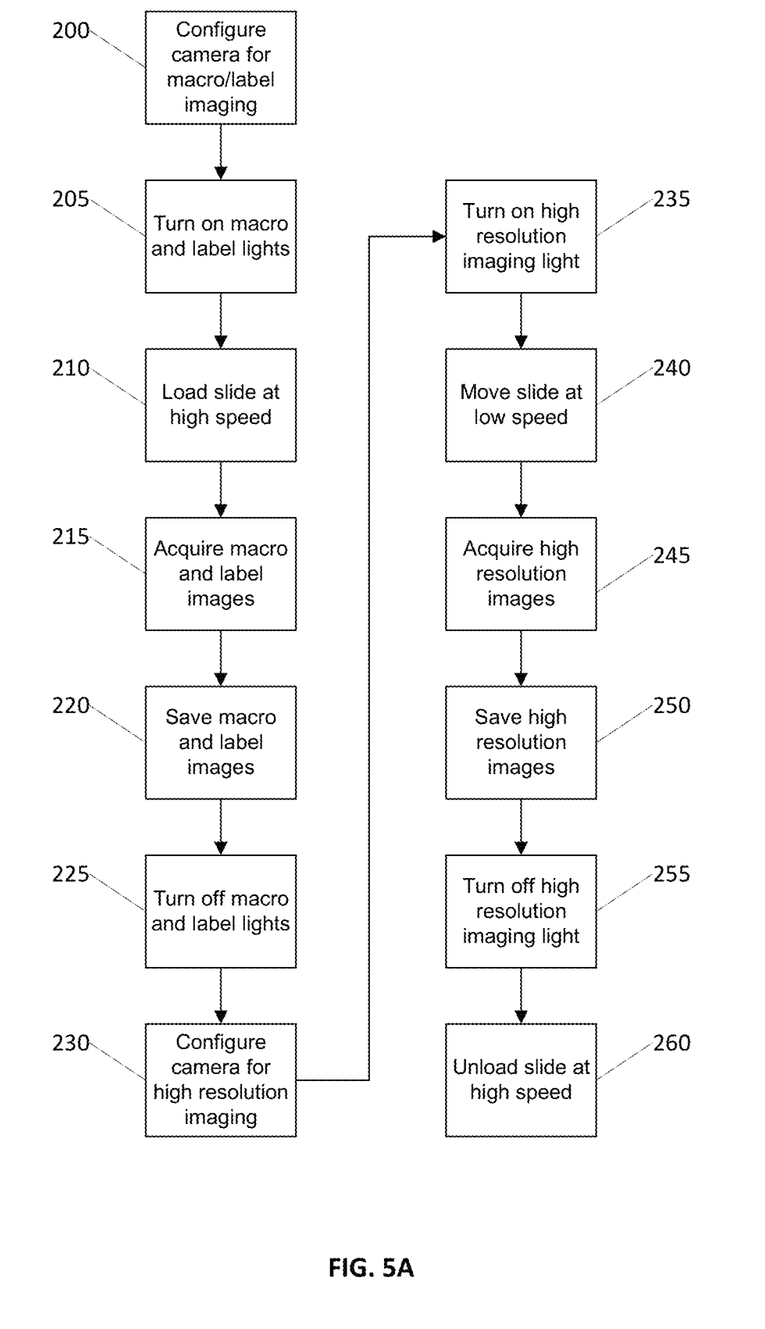
FIG. 5A is a flow diagram illustrating an example process for combined low resolution imaging and high resolution imaging using the same line scan camera, according to an embodiment of the invention.

FIG. 5A is a flow diagram illustrating an example process for combined low resolution imaging and high resolution imaging using the same line scan camera, according to an embodiment of the invention. The illustrated process can be carried out, for example, by a system as described in FIGS. 3-4 and 7A-7D. In the illustrated embodiment, in step 200 the system initially configures the line scan camera for low resolution imaging via the first optical path having the macro lens. Next, in step 205, the first and second illumination systems are turned on such that both transmission mode and oblique mode illumination is present in the optical path defined by the line scan camera and the macro lens. Next, in step 210 the stage supporting the slide is moved at a first speed (e.g., a relatively high speed) with respect to the field of view of the line scan camera via the macro lens to capture a whole slide image of the entire glass slide (or substantially the entire glass slide), as shown in step 215. The resulting whole slide image includes an image of the entire label area of the glass slide and the entire sample area of the glass slide. The whole slide image can thereafter be processed to generate a label image that includes only an image of the entire label area (or a portion thereof) and to generate a sample image that includes only an image of the entire sample area (or a portion thereof). The label image of the label area and the macro image of the sample area are saved as shown in step 220.

After the low resolution image acquisition is complete, the first and second illumination systems are turned off in step 225 and the line scan camera is reconfigured for high resolution imaging in step 230. Next, in step 235, a third illumination system (high resolution imaging illumination) is turned on and the slide is repeatedly moved at a second speed in step 240 (e.g., a relatively lower speed than low resolution imaging) with respect to the field of view of the line scan camera. In step 245, the system captures a plurality of image stripes of the specimen area of the slide. The stripes are combined together and stored as a contiguous image of the whole sample area as shown in step 250. After the high resolution image acquisition is complete, in step 255 the third illumination system is turned off and the slide is unloaded from the stage at high speed in step 260.

Figure 5B:
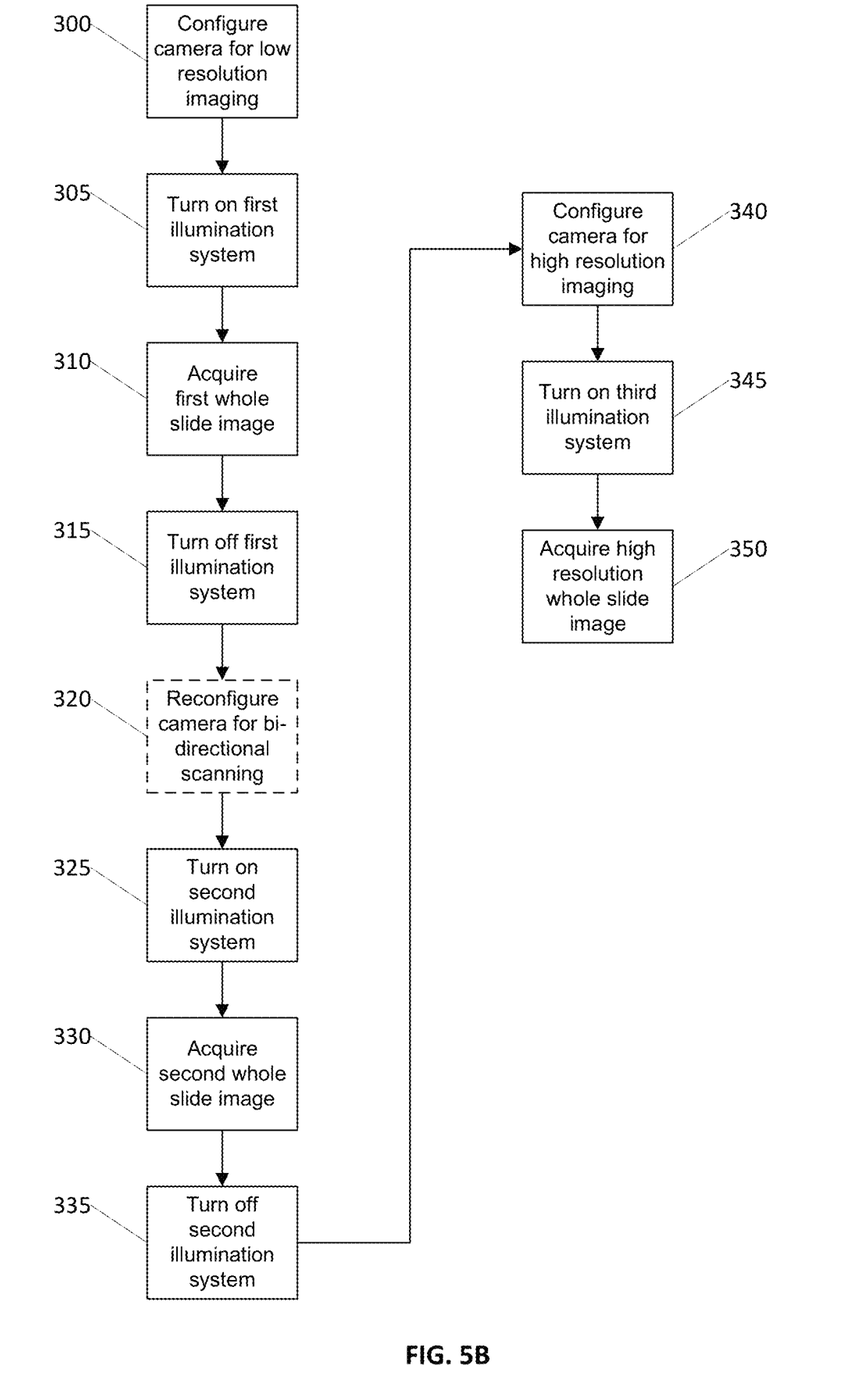
FIG. 5B is a flow diagram illustrating an alternative example process for combined bi-directional scanning low resolution imaging and high resolution imaging using the same line scan camera, according to an embodiment of the invention.

FIG. 5B is a flow diagram illustrating an alternative example process for combined bi-directional scanning low resolution imaging and high resolution imaging using the same line scan camera, according to an embodiment of the invention. The illustrated process can be carried out, for example, by a system as described in FIGS. 3-4 and 7A-7D. In the illustrated embodiment, in step 300 the system initially configures the line scan camera for low resolution imaging via the first optical path having the macro lens. Next, in step 305 the first illumination system is turned on such that transmission mode illumination is present in the optical path defined by the line scan camera and the macro lens. Next, in step 310 the slide is moved at a first speed (e.g., a relatively high speed) with respect to the field of view of the line scan camera via the macro lens to capture a first whole slide image of the entire glass slide (or substantially the entire glass slide) and then the first illumination system is turned off as shown in step 315. Next, in step 320 the line scan camera is optionally reconfigured for bi-directional scanning in the opposite direction, depending on the type of line sensor being used.

Next, in step 325 the second illumination system is turned on such that oblique mode illumination is present in the optical path defined by the line scan camera and the macro lens. Next, in step 330 the slide is moved at the first speed with respect to the field of view of the line scan camera via the macro lens to capture a second whole slide image of the entire glass slide (or substantially the entire glass slide) and then the second illumination system is turned off as shown in step 335. The first and second whole slide images can be subsequently processed to generate a label image comprising the entire label area of the glass slide and to generate a sample image comprising the entire sample area of the glass slide and to generate a whole slide image comprising both the entire label area of the glass slide and the entire sample area of the glass slide.

After the low resolution images are acquired, in step 340 the system reconfigures the line scan camera for high resolution imaging and turns on a third illumination system in step 345. Then the slide is repeatedly moved at a second speed in step 350 (e.g., a relatively lower speed than low resolution imaging) with respect to the field of view of the line scan camera via the objective lens to capture a plurality of image stripes of the specimen area of the slide. The high resolution image stripes are combined together and stored as a contiguous high resolution image of the whole sample area.

Figure 6:
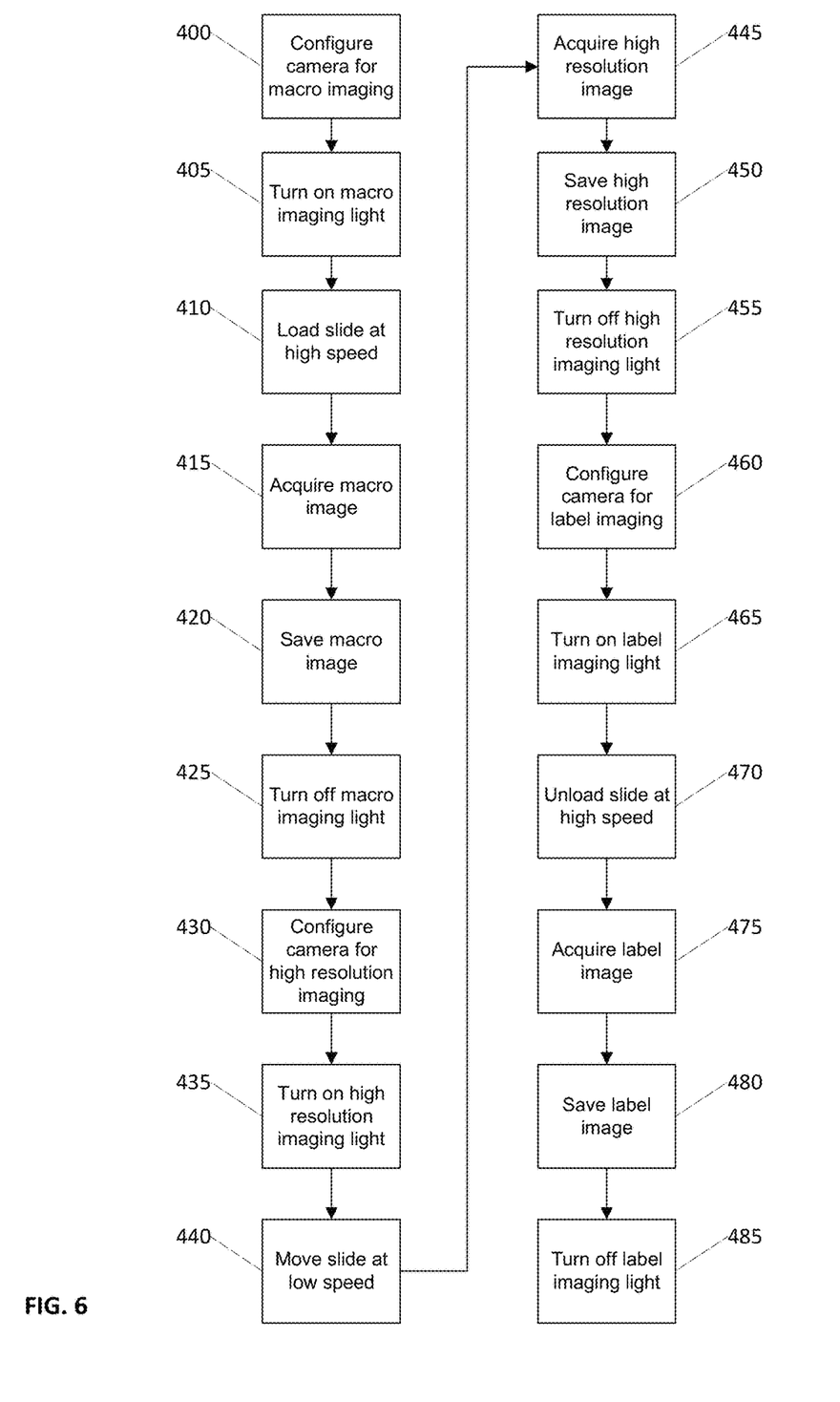
FIG. 6 is a flow diagram illustrating an alternative example process for combined low resolution imaging and high resolution imaging using the same line scan camera, according to an embodiment of the invention.

FIG. 6 is a flow diagram illustrating an alternative example process for combined low resolution imaging and high resolution imaging using the same line scan camera, according to an embodiment of the invention. The illustrated process can be carried out, for example, by a system as previously described in FIGS. 3-4 and 7A-7D. In the illustrated embodiment, in step 400 the system initially configures the line scan camera for transmission mode low resolution imaging via the first optical path having the macro lens. Next, in step 405 the first illumination system is turned on such that transmission mode illumination is present in the optical path defined by the line scan camera and the macro lens. Next, in step 410 the slide is moved at a first speed (e.g., a relatively high speed) with respect to the field of view of the line scan camera via the macro lens to capture a first whole slide image of the entire glass slide (or substantially the entire glass slide) as shown in step 415. The first whole slide image of the entire glass slide (i.e., macro image) is saved in step 420.

After acquisition of the first whole slide image at low resolution is complete, in step 425 the first illumination system is turned off and the line scan camera is reconfigured in step 430 for high resolution imaging. Next, in step 435 a third illumination system is turned on and the slide is repeatedly moved at a second speed in step 440 (e.g., a relatively lower speed than low resolution imaging) with respect to the field of view of the line scan camera via the objective lens to capture a plurality of image stripes of the specimen area of the slide as shown in step 445. The stripes are combined together and stored in step 450 as a high resolution contiguous image of the whole sample area and/or stored as individual image stripes and then the third illumination system is turned off in step 455.

Next, in step 460 the system reconfigures the line scan camera for oblique mode low resolution imaging via the first optical path having the macro lens. Then, in step 465 the second illumination system is turned on such that oblique mode illumination is present in the optical path defined by the line scan camera and the macro lens. Next, in step 470 the slide is moved at the first speed (e.g., a relatively high speed) with respect to the field of view of the line scan camera via the macro lens to capture a second whole slide image of the entire glass slide (or substantially the entire glass slide), as shown in step 475. The second whole slide image (i.e., label image) is saved in step 480. The first and second whole slide images can be subsequently processed to generate a label image comprising the entire label area of the glass slide and to generate a sample image comprising the entire sample area of the glass slide and to generate a whole slide image comprising both the entire label area of the glass slide and the entire sample area of the glass slide. Finally, in step 485 the label imaging light is turned off.

Figure 7A:
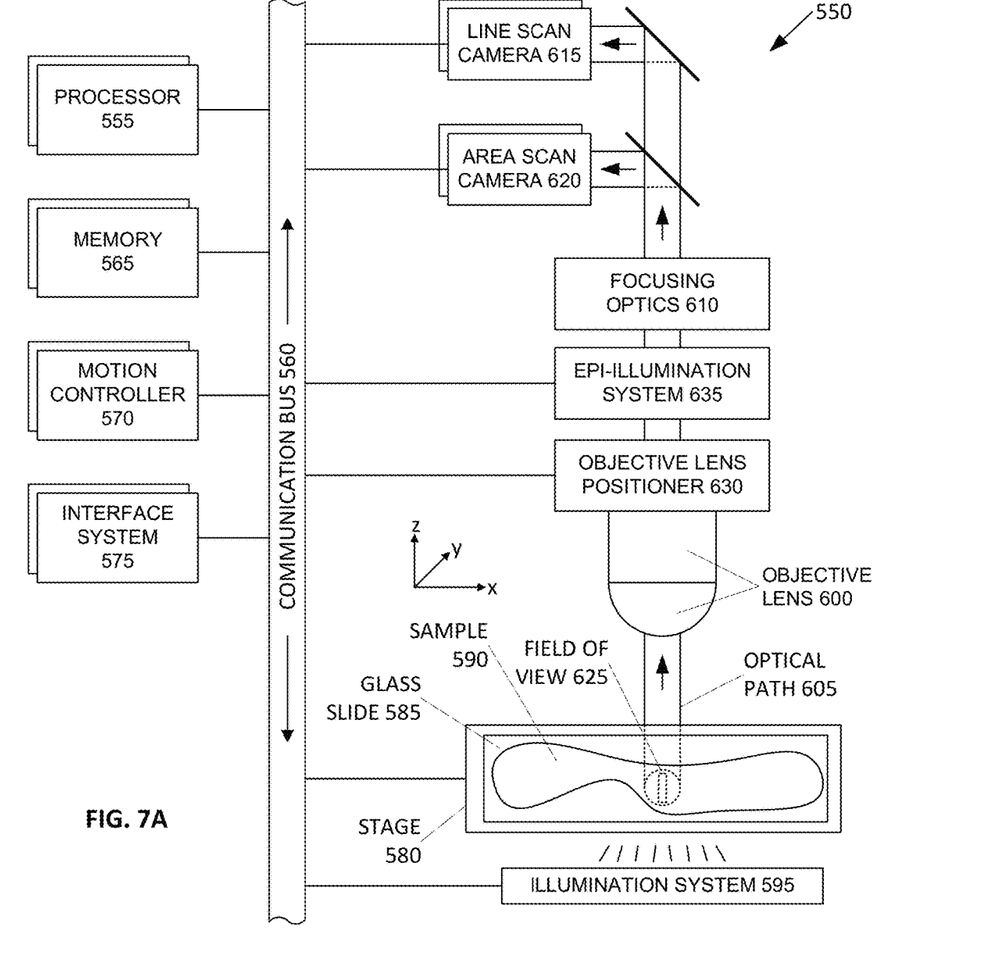
FIG. 7A is a block diagram illustrating an example processor enabled device 550 that may be used in connection with various embodiments described herein.

FIG. 7A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 4× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras that is configured to function as an imaging sensor. The focusing sensor can be logically positioned on the same optical path as the imaging sensor or the focusing sensor may be logically positioned before or after the imaging sensor with respect to the scanning direction of the scanner system 550.

In such an embodiment with at least one line scan camera 615 functioning as a focusing sensor, the image data generated by the focusing sensor is stored a portion of the memory 565 and processed by the one or more processors 555 to generate focus information to allow the scanner system 550 to adjust the relative distance between the sample 590 and the objective lens 600 to maintain focus on the sample during scanning.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 7B:
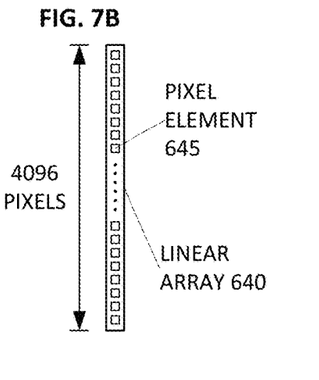
FIG. 7B is a block diagram illustrating an example line scan camera having a single linear array.

FIG. 7B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figures 7C, 7D:
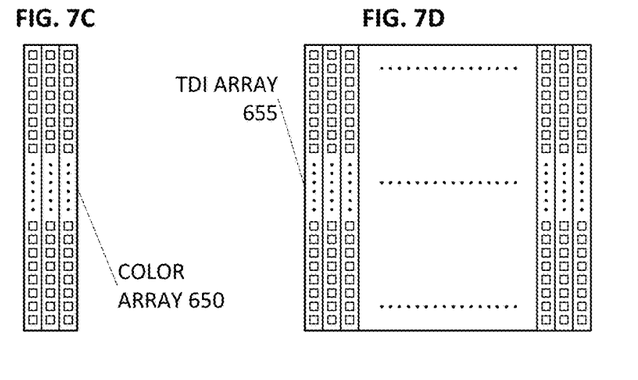
FIG. 7C is a block diagram illustrating an example line scan camera having three linear arrays.
FIG. 7D is a block diagram illustrating an example line scan camera having a plurality of linear arrays.

FIG. 7C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

FIG. 7D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. An imaging system configured to reduce hardware and processing time, the system comprising:
   a stage configured to support a slide having a specimen area and a label area;
   a line scan camera configured to image a first field of view along a first optical path between the stage and the line scan camera and a second field of view along a second optical path between the stage and the same line scan camera;
   a macro lens optically coupled with the line scan camera along the first optical path to allow the line scan camera to capture in the first field of view an entire width of the specimen and an entire width of the label area;
   an objective lens optically coupled with the same line scan camera along the second optical path;
   a first illumination system configured to illuminate the first field of view;
   a second illumination system configured to illuminate the second field of view; and
   at least one processor configured to control the first illumination system, the second illumination system, the stage, and the line scan camera such that the system uses the macro lens and first optical path to capture a full width image of the slide during a single stage movement.

2. The imaging system of claim 1, wherein the objective lens has a higher magnification than the macro lens.

3. The imaging system of claim 1, wherein the first field of view encompasses an entire width of the specimen area and an entire width of the label area.

4. The imaging system of claim 1, wherein the first illumination system comprises a transmission mode illumination system that illuminates the first field of view from below the stage and an oblique mode illumination system that illuminates the first field of view from above the stage.

5. The imaging system of claim 4, wherein the at least one processor is configured to generate a macro image of the whole slide by moving the stage in a single direction, while the first field of view is being simultaneously illuminated by both the transmission mode illumination system and the oblique mode illumination system, to capture the macro image via the line scan camera during a single unidirectional scan.

6. An imaging system comprising:
   a stage configured to support a slide having a specimen area and a label area;
   a camera configured to image a first field of view along a first optical path between the stage, a macro lens, and the camera and a second field of view along a second optical path between the stage, an objective lens, and the camera;
   a transmission mode illumination system configured to illuminate the first field of view;
   an oblique mode illumination system configured to illuminate the second field of view; and
   at least one processor configured to generate a macro image of the whole slide by:
      moving the stage in a first direction, while the first field of view is illuminated by the transmission mode illumination system to capture a first whole slide image via the camera;
      moving the stage in a second direction that is opposite the first direction, while the first field of view is illuminated by the oblique mode illumination system to capture a second whole slide image via the camera; and
      generate the macro image by combining the specimen area in the first whole slide image with the label area in the second whole slide image.

7. An imaging system comprising:
   a stage configured to support a slide having a specimen area and a label area;
   a camera configured to image a first field of view along a first optical path between the stage, a macro lens, and the camera and a second field of view along a second optical path between the stage, an objective lens, and the camera;
   a transmission mode illumination system configured to illuminate the first field of view;
   an oblique mode illumination system configured to illuminate the second field of view; and
   at least one processor configured to:
      configure the camera for low-resolution imaging via the first optical path;
      turn on the transmission mode illumination system and the oblique mode illumination system to simultaneously illuminate the first field of view;
      control the stage to move at a first speed to capture a macro image of the entire specimen area and the entire label area in a single unidirectional scan while the transmission mode illumination system and the oblique mode illumination system simultaneously illuminate the first field of view;
      turn off the transmission mode illumination system and the oblique mode illumination system;
      reconfigure the camera for high-resolution imaging via the second optical path;

turn on the second illumination system to illuminate the second field of view;

control the stage to move at a second speed to capture a plurality of high-resolution image stripes of portions of the specimen area while the second illumination system illuminates the second field of view;

turn off the second illumination system; and assemble the plurality of high-resolution image stripes into a contiguous high-resolution image of at least a portion of the specimen area.

8. The imaging system of claim 7, wherein the at least one processor is configured to generate both a specimen image of the entire specimen area and a label image of the entire label area from the macro image.

9. The imaging system of claim 7, wherein the second speed is faster than the first speed.

10. An imaging system comprising:

a stage configured to support a slide having a specimen area and a label area;

a camera configured to image a first field of view along a first optical path between the stage and the camera and a second field of view along a second optical path between the stage and the camera;

a transmission mode illumination system configured to illuminate the first field of view;

an oblique mode illumination system configured to illuminate the second field of view; and at least one processor configured to:

configure the camera for low-resolution imaging via the first optical path in a first direction;

turn on one of the transmission mode illumination system and the oblique mode illumination system to illuminate the first field of view;

control the stage to capture a first macro image of the slide in a first single unidirectional scan in the first direction while the first field of view is illuminated by the one of the transmission mode illumination system and the oblique mode illumination system;

turn off the one of the transmission mode illumination system and the oblique mode illumination system;

turn on the other one of the transmission mode illumination system and the oblique mode illumination system;

reconfigure the camera for low-resolution imaging via the first optical path in a second direction that is opposite the first direction;

control the stage to capture a second macro image of the slide in a second single unidirectional scan in the second direction while the first field of view is illuminated by the other one of the transmission mode illumination system and the oblique mode illumination system;

turn off the other one of the transmission mode illumination system and the oblique mode illumination system;

reconfigure the camera for high-resolution imaging via the second optical path;

turn on the second illumination system to illuminate the second field of view;

control the stage to capture a plurality of high-resolution image stripes of portions of the specimen area in a plurality of high-resolution scans while the second field of view is illuminated by the second illumination system;

turn off the second illumination system; and assemble the plurality of high-resolution image stripes into a contiguous high-resolution image of at least a portion of the specimen area.

11. The imaging system of claim 10, wherein the at least one processor is configured to combine the first macro image and the second macro image into a composite macro image of both the specimen area and the label area.

12. The imaging system of claim 10, wherein the first single unidirectional scan and the second single unidirectional scan are both performed before the plurality of high-resolution scans.

13. The imaging system of claim 10, wherein the first single unidirectional scan is performed before the plurality of high-resolution scans, and wherein the second single unidirectional scan is performed after the plurality of high-resolution scans.

14. The imaging system of claim 1, wherein the at least one processor is configured to:

control the stage to move the slide through the first field of view to capture a macro image of the whole slide in a single unidirectional or bidirectional scan;

control the stage to move the slide through the second field of view to capture a plurality of image stripes of portions of the specimen area in a plurality of unidirectional or bidirectional scans; and assemble the plurality of image stripes into a high-resolution image of at least a portion of the specimen area.

15. The imaging system of claim 1, wherein the line scan camera is a color line scan camera.

16. The imaging system of claim 15, wherein the color line scan camera comprises one or more single-line color line scan sensors, wherein each single-line color line scan sensor comprises sensors for a plurality of different color channels.

17. The imaging system of claim 15, wherein the color line scan camera comprises one or more dual-line color line scan sensors, wherein each dual-line color line scan sensor comprises a first line of sensors for a plurality of different color channels and a second line of sensors for a single color channel.

18. The imaging system of claim 15, wherein the color line scan camera comprises one or more trilinear color line scan sensors, wherein each trilinear color line scan sensor comprises a first line of sensors for a first one of a plurality of different color channels, a second line of sensors for a second one of the plurality of different color channels, and a third line of sensors for a third one of the plurality of different color channels.

19. A method of imaging using an imaging system that comprises a stage configured to support a slide having a specimen area and a label area, a line scan camera configured to image a first field of view along a first optical path between the stage and the line scan camera and a second field of view along a second optical path between the stage and the line scan camera, a transmission mode illumination system configured to illuminate the first field of view, an oblique mode illumination system configured to illuminate the first field of view, and a high-resolution illumination system configured to illuminate the second field of view, wherein the method comprises using at least one processor of the imaging system to:

configure the line scan camera for low-resolution imaging via the first optical path;

turn on the transmission mode illumination system and the oblique mode illumination system to simultaneously illuminate the first field of view;

control the stage to move at a first speed to capture a macro image of the entire specimen area and the entire label area in a single unidirectional scan while the transmission mode illumination system and the oblique mode illumination system simultaneously illuminate the first field of view;

turn off the transmission mode illumination system and the oblique mode illumination system;

reconfigure the line scan camera for high-resolution imaging via the second optical path;

turn on the high-resolution illumination system to illuminate the second field of view;

control the stage to move at a second speed to capture a plurality of high-resolution image stripes of portions of the specimen area while the second field of view is illuminated by the high-resolution illumination system;

turn off the high-resolution illumination system; and assemble the plurality of high-resolution image stripes into a contiguous high-resolution image of at least a portion of the specimen area.

20. A method of imaging using an imaging system that comprises a stage configured to support a slide having a specimen area and a label area, a line scan camera configured to image a first field of view along a first optical path between the stage and the line scan camera and a second field of view along a second optical path between the stage and the line scan camera, a transmission mode illumination system configured to illuminate the first field of view, an oblique mode illumination system configured to illuminate the first field of view, and a high-resolution illumination system configured to illuminate the second field of view, wherein the method comprises using at least one processor of the imaging system to:

configure the line scan camera for low-resolution imaging via the first optical path in a first direction;

turn on one of the transmission mode illumination system and the oblique mode illumination system to illuminate the first field of view;

control the stage to capture a first macro image of the slide in a first single unidirectional scan in the first direction while the one of the transmission mode illumination system and the oblique mode illumination system illuminates the first field of view;

turn off the one of the transmission mode illumination system and the oblique mode illumination system;

turn on another one of the transmission mode illumination system and the oblique mode illumination system;

reconfigure the line scan camera for low-resolution imaging via the first optical path in a second direction that is opposite the first direction;

control the stage to capture a second macro image of the slide in a second single unidirectional scan in the second direction while the other one of the transmission mode illumination system and the oblique mode illumination illuminates the first field of view;

turn off the other one of the transmission mode illumination system and the oblique mode illumination system;

reconfigure the line scan camera for high-resolution imaging via the second optical path;

turn on the high-resolution illumination system to illuminate the second field of view;

control the stage to capture a plurality of high-resolution image stripes of portions of the specimen area in a plurality of high-resolution scans while the high-resolution illumination system illuminates the second field of view;

turn off the high-resolution illumination system; and assemble the plurality of high-resolution image stripes into a contiguous high-resolution image of at least a portion of the specimen area.

* * * * *